US012623889B2

(12) United States Patent
Braun

(10) Patent No.: US 12,623,889 B2
(45) Date of Patent: May 12, 2026

(54) SUPPORTING CONSTRUCTION

(71) Applicant: Putzmeister Engineering GmbH, Aichtal (DE)

(72) Inventor: Matthias Braun, Aichtal (DE)

(73) Assignee: Putzmeister Engineering GmbH, Aichtal (DE)

( * ) Notice: Subject to any disclaimer, the term of this patent is extended or adjusted under 35 U.S.C. 154(b) by 253 days.

(21) Appl. No.: 18/551,101

(22) PCT Filed: Mar. 16, 2022

(86) PCT No.: PCT/EP2022/056832
§ 371 (c)(1),
(2) Date: Sep. 18, 2023

(87) PCT Pub. No.: WO2022/194935
PCT Pub. Date: Sep. 22, 2022

(65) Prior Publication Data

US 2024/0166478 A1 May 23, 2024

(30) Foreign Application Priority Data

Mar. 18, 2021 (DE) ..................... 10 2021 106 729.4

(51) Int. Cl.
*B66C 23/78* (2006.01)

(52) U.S. Cl.
CPC .................................... *B66C 23/78* (2013.01)

(58) Field of Classification Search
CPC ...................................................... B66C 23/78
See application file for complete search history.

(56) References Cited

U.S. PATENT DOCUMENTS 3,719,403 A * 3/1973 Sung ..................... B66C 23/707 384/35
4,394,912 A * 7/1983 Epps ....................... B66C 23/78 280/765.1

(Continued)

FOREIGN PATENT DOCUMENTS

CA 946790 A 5/1974
DE 202004011443 U1 10/2004

(Continued)

OTHER PUBLICATIONS

DE-102004035416-A1 English Translation (Year: 2006).*

(Continued)

*Primary Examiner* — Michael T. Walsh
(74) *Attorney, Agent, or Firm* — Alix, Yale & Ristas, LLP

(57) ABSTRACT

Supporting construction (10) for a working machine comprising a mast, having a supporting leg box (12), which is open to a front side (16), and having a supporting leg (20) which is mounted displaceably in the longitudinal direction for moving between a completely retracted position and a position in which it is completely extended by a maximum extension length (A), wherein the supporting leg box (12) has, in the region of the open front side (16), a first load introduction device (30) and, at a given distance (D) from the front side (16), within the supporting leg box, a single second load introduction device (32) having at least one supporting surface (34), and wherein the supporting leg (20) has a reinforcing element (36) which extends substantially along a length (L) of the supporting leg (20) and which is designed to bear on the at least one supporting surface (34) of the single second load introduction device (32).

18 Claims, 6 Drawing Sheets

(56) References Cited

U.S. PATENT DOCUMENTS

| | | | | |
|---|---|---|---|---|
| 2010/0196096 A1* | 8/2010 | Halonen | ............... | E01C 19/405 404/84.1 |
| 2016/0347590 A1* | 12/2016 | Daum | ..................... | B66C 23/78 |

FOREIGN PATENT DOCUMENTS

| | | | | | |
|---|---|---|---|---|---|
| DE | 102004035416 | A1 * | 2/2006 | ............. | B66C 23/78 |
| DE | 102014014038 | A1 | 3/2016 | | |
| JP | S6028563 | U * | 2/1985 | | |
| JP | 2716819 | B2 * | 2/1998 | ............. | B66C 23/76 |
| JP | H10265177 | A * | 10/1998 | | |

OTHER PUBLICATIONS

JP-S6028563-U English Translation (Year: 1985).*
JP-H10265177-A English Translation (Year: 1998).*
JP-2716819-B2 English Translation (Year: 1998).*
PCT International Search Report and Written Opinion for International Application No. PCT/EP2022/056832 filed on Mar. 16, 2022; Date of Mailing: Jul. 7, 2022; 12 pgs.
German Office Action for Application No. 10 2021 106 729.4 filed on Mar. 18, 2021; Dated Nov. 3, 2021; 6pgs.
Japanese Examination Report for Patent Application No. 2023-555591, Drafting Date: Nov. 7, 2025, Dispatch Date: Nov. 18, 2025, 12 pgs.

* cited by examiner

SUPPORTING CONSTRUCTION

TECHNICAL FIELD

The present invention relates to a supporting construction for a work machine, in particular a work machine having a mast.

BACKGROUND

Supporting constructions of the type stated at the outset are used to support work machines provided with a mast, in particular a boom arrangement comprising a plurality of mast arms. When the mast is not in operation, supporting legs of the supporting construction are moved into a supporting leg box in a space-saving manner, ensuring that they do not protrude or protrude only slightly when the machine is being moved to another location. When the work machine, for example a mobile concrete pump, is in operation, the extended supporting leg often has to absorb large forces, which are transmitted via the supporting leg box and directed onto the ground. In this context, the force is generally transmitted from the supporting leg box to the supporting leg at two points: the supporting leg rests on the top of the supporting leg box in the region or area of the opening of the latter, and at its rear end is supported in the supporting leg box, on the bottom thereof.

Known supporting legs have a hollow body, at the end of which that protrudes from the supporting leg box a supporting foot projects downward. The hollow body is composed of vertically oriented web plates and horizontally oriented flange plates. To prevent the supporting leg from buckling at the points where the force is introduced from the supporting leg box, the supporting leg must be designed to be particularly stable at these points. This is generally achieved by welding transverse diaphragms into the supporting leg, which means that the supporting leg can only be used in those settings in which the force is introduced in the region of the transverse diaphragms. This reduces the number of possible settings of the supporting leg. In most cases, the work machine can only be operated with the supporting leg fully extended, half extended or not extended at all. Installing a multiplicity of transverse diaphragms in the supporting leg would disadvantageously increase the weight thereof.

DE 10 2014 014 038 A1 discloses a supporting construction of the type in question in which the web plates of the supporting legs are exposed and form lower and upper bearing surfaces, and the supporting legs rest with the downward-facing narrow sides of the web plates on two supporting strips in the supporting leg box, which extend in the longitudinal direction at a distance from one another.

DE 20 2004 011 443 U1 discloses a supporting device for load bearing structures with projecting loads, in which upper load introduction blocks are provided on an inner side of the supporting leg box in the area of its opening, and lower load introduction blocks, which are arranged in a fixed manner in the interior of the supporting leg box, are provided at a distance from the upper blocks. Load introduction blocks are screwed on or bolted.

SUMMARY OF THE INVENTION

Proceeding from this, the proposal according to the invention is for a supporting construction having the features of claim 1.

The invention is based on the insight of providing a single load introduction point in the interior of the supporting leg box, combined with a reinforcement, extending substantially over the entire length of the supporting leg or the extendable leg, for the purpose of support on the single load introduction point.

According to the invention, structurally simple and low-cost load introduction with force flow optimization is thus provided. The combination of a single load introduction point in the supporting leg box (in addition to the upper-flange load introduction provided at an open end of the supporting leg box) and a continuous reinforcement in the supporting leg to be extended allows support with a large number of leg settings (i.e. different extension lengths), right up to full flexibility. This allows more flexible utilization capabilities of the work machine equipped with the supporting construction according to the invention.

The invention thus relates to a supporting construction for a work machine that has a mast, having a supporting leg box, which is open to a front side, and having a supporting leg, which is mounted in the supporting leg box so as to be movable in the longitudinal direction for movement between a fully retracted position and a position in which it is fully extended by a maximum extension length, wherein a first load introduction device and a single second load introduction device are provided in or on the supporting leg box, the first load introduction device for absorbing a force that is to be dissipated upward in the supporting leg box during operation and the single second load introduction device for absorbing a force to be dissipated downward in the supporting leg box during operation, and wherein the supporting leg has a reinforcing element extending substantially over a length of the supporting leg and which is designed to rest on the single second load introduction device.

The supporting leg can be of multi-part design, e.g. can be designed as a telescopic leg.

The supporting construction comprises exactly one first load introduction device and exactly one second load introduction device.

A load introduction device is to be understood as an arrangement of at least one load introduction element suitable for load dissipation.

Further advantages and embodiments of the invention will become apparent from the dependent claims, the description and the accompanying drawing.

It is self-evident that the features mentioned above and those that will be explained below can be used not only in the respectively specified combination but also in other combinations or on their own without departing from the scope of the present invention.

The invention is illustrated in a highly schematic way and not to scale in the drawing by means of an exemplary embodiment and is described below in detail with reference to the drawing.

DETAILED DESCRIPTION

Identical and similar features illustrated in the individual Figs. are denoted by the same reference signs.

Figure 1:
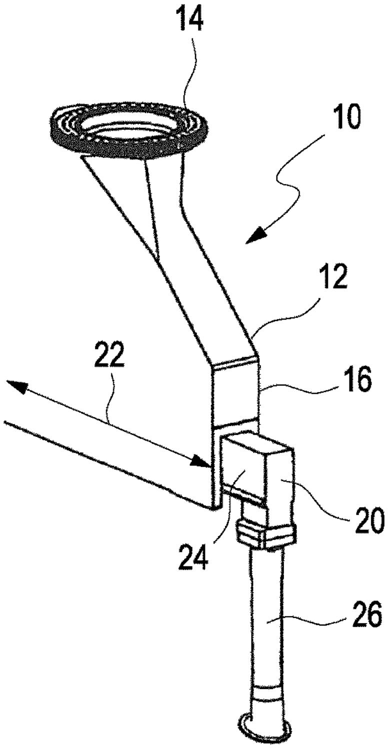
FIG. 1 shows, in greatly simplified form, a supporting construction having a supporting leg, a supporting leg box and a bearing block for a mast mounted on the supporting leg box.

FIG. 1 shows a schematic perspective illustration of a supporting construction 10 for a work machine having a mast. The supporting construction 10 comprises, in a manner known per se, a supporting leg box 12, which is integrated into a bearing block 14 for the mast. The supporting leg box 12 is open toward a front side 16 and is designed as a box-shaped or cuboidal hollow body.

Accommodated in the supporting leg box 12 is a supporting leg 20 having a hollow body 24 extending in a longitudinal direction 22 and slidingly movable in the supporting leg box 12 in the longitudinal direction 22, and a downwardly projecting supporting foot 26 mounted on a front end of the hollow body 24. The illustration in FIG. 1 shows the supporting leg 20 in a partially extended setting or position.

The supporting leg 20 has a length L and, in a fully retracted position, is accommodated over substantially its entire length L in the supporting leg box 12 (projections through the open front side 16 and possibly also through a likewise open rear side (not illustrated) are possible). The supporting leg 20 can be moved out of the supporting leg box 12 by a maximum extension length A by moving it through the open front side 16 of the supporting leg box 12. In the fully extended position, a residual length D, which corresponds substantially to the total length L minus the maximum extension length A, remains in the supporting leg box 12 (cf. FIGS. 2 and 3). With the invention, any partially extended intermediate settings of the supporting leg are possible.

Figure 6:
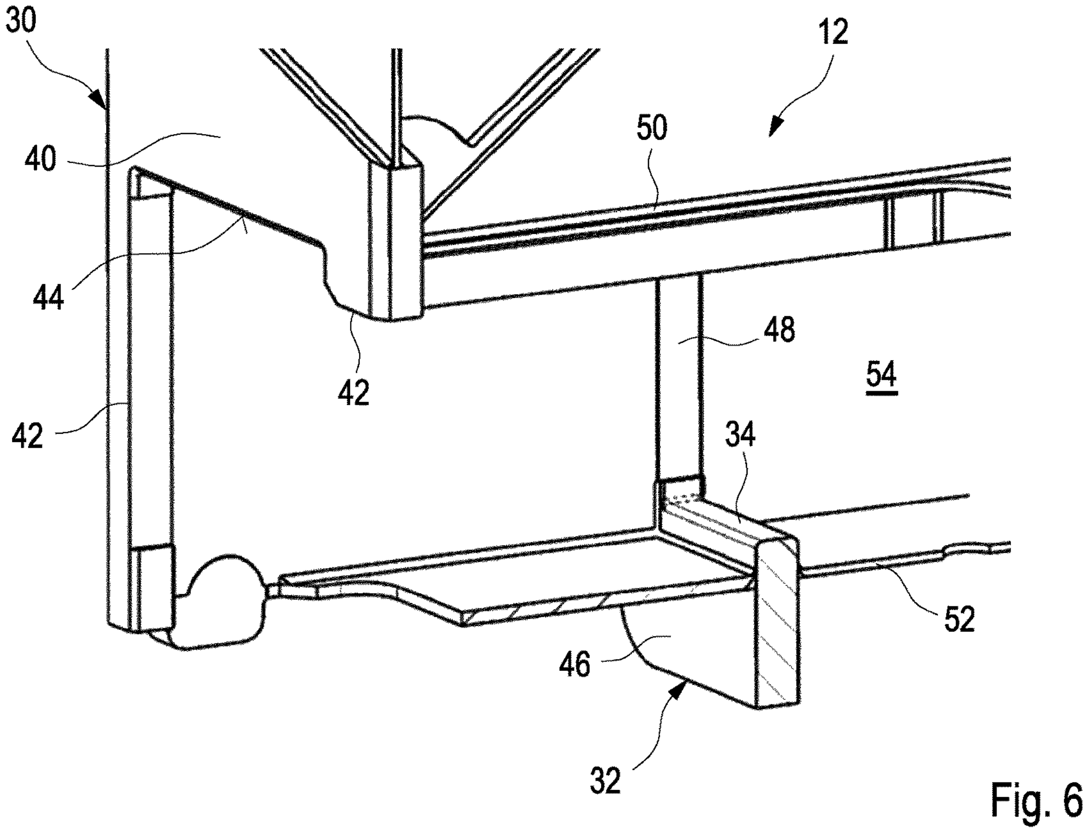
FIG. 6 shows a perspective cutaway illustration of a supporting leg box according to the first embodiment.
Figure 7:
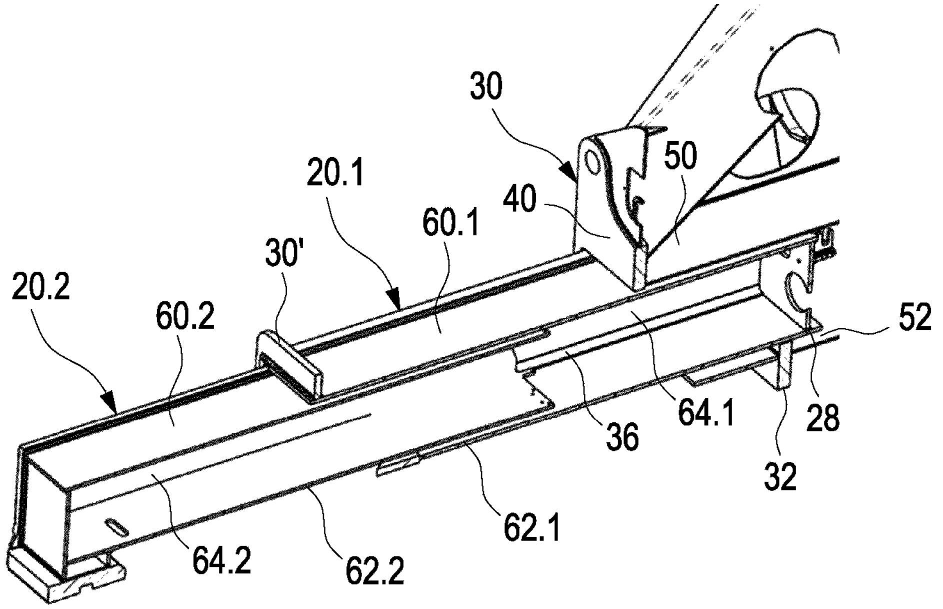
FIG. 7 shows a lateral sectional perspective illustration of a further telescopic leg variant of the first embodiment in the extended state.
Figure 9:
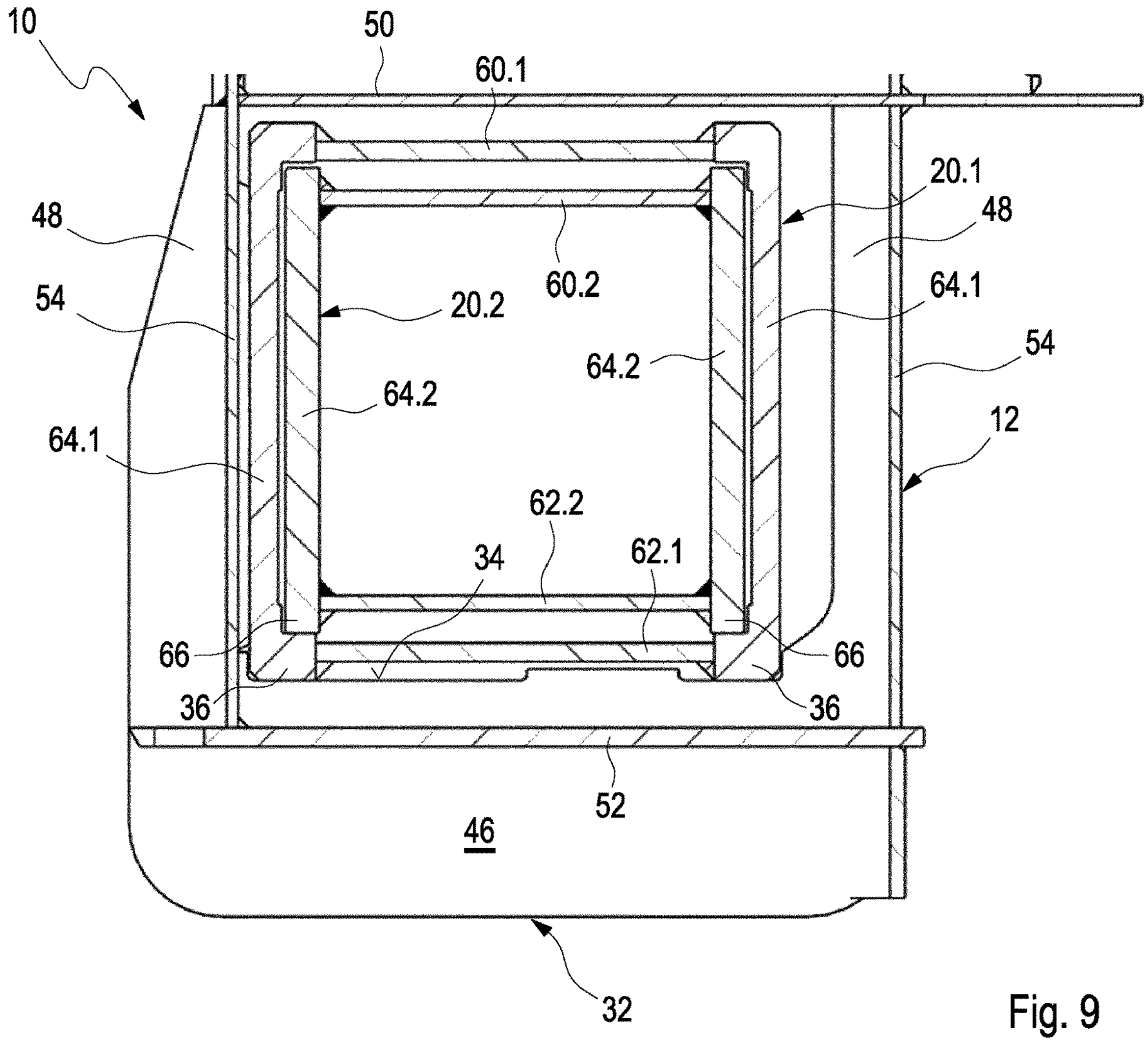
FIG. 9 shows the supporting construction of FIG. 7 in cross section.
Figure 12:
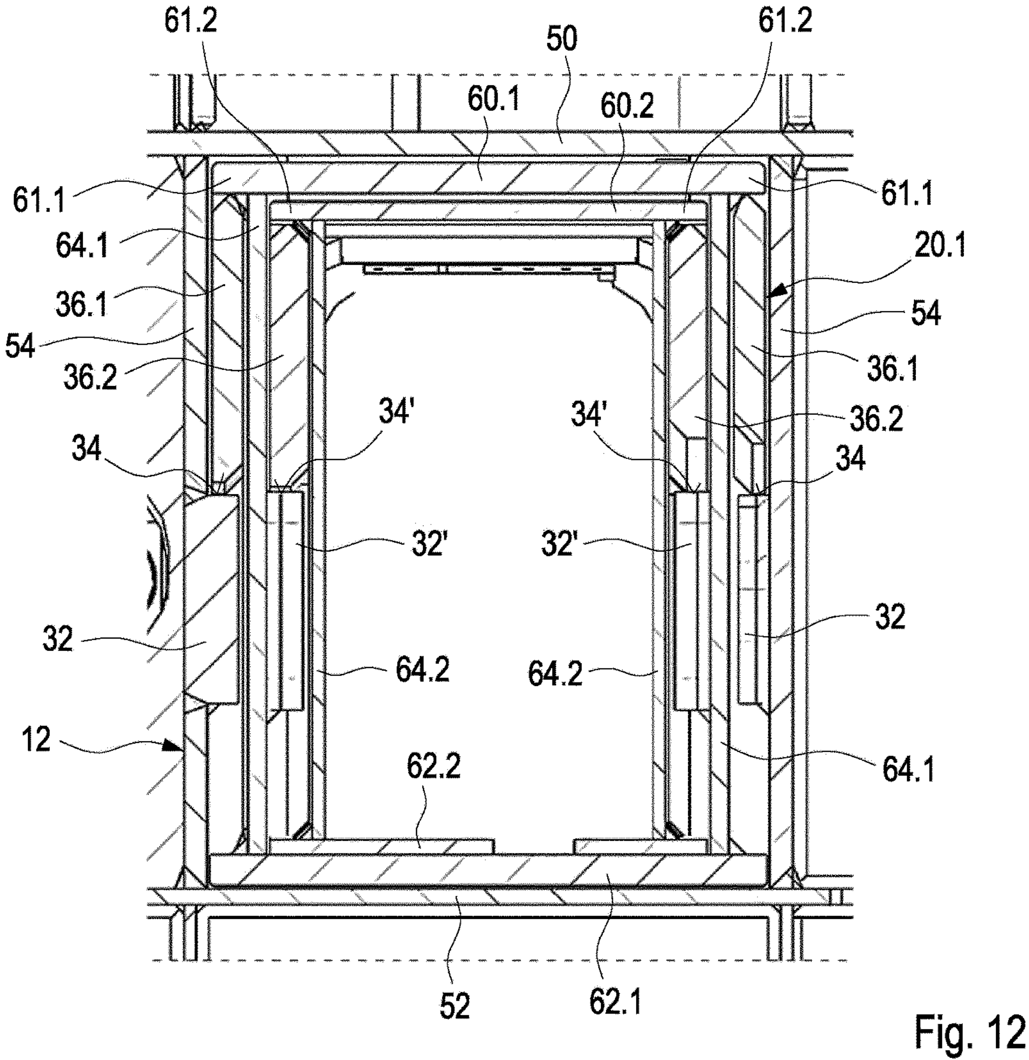
FIG. 12 shows the supporting construction of FIG. 10 in cross section.

As can be seen, for example, from FIGS. 6, 9 and 12, the hollow body 24 of the supporting leg 20 can be assembled, in particular by welding, from two web plates 64 running parallel to one another at a distance from one another and two flange plates 60, 62 running parallel to one another and connecting the web plates 64 to one another, namely an upper flange 60 and a lower flange 62. The supporting leg box 12 is correspondingly assembled, in particular by welding, from two web plates 54 running parallel to one another at a distance from one another and two flange plates 50, 52 running parallel to one another at a distance from one another and connecting the web plates 54 to one another, namely an upper flange 50 and a lower flange 52.

Figure 14A:
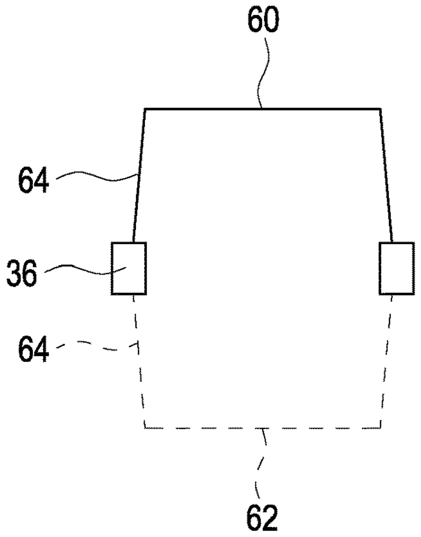
FIGS. 14*a*-14*d* show possible variants of the structure of a hollow supporting leg body.
Figure 14B:
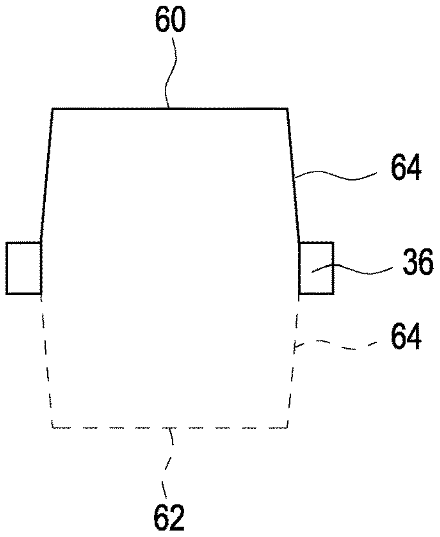
Figure 14C:
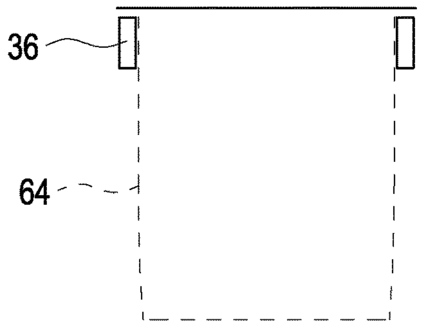
Figure 14D:
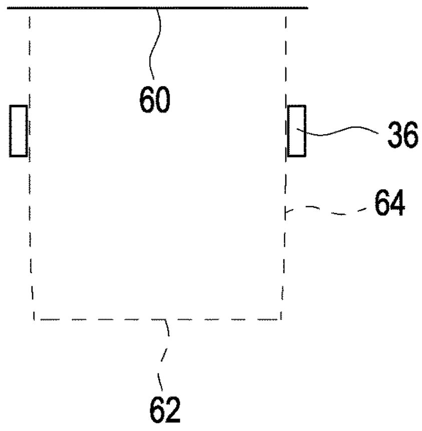

In principle, other embodiments of the hollow body 24 are also conceivable, as illustrated in FIGS. 14-14*d* and described below.

Figure 2:
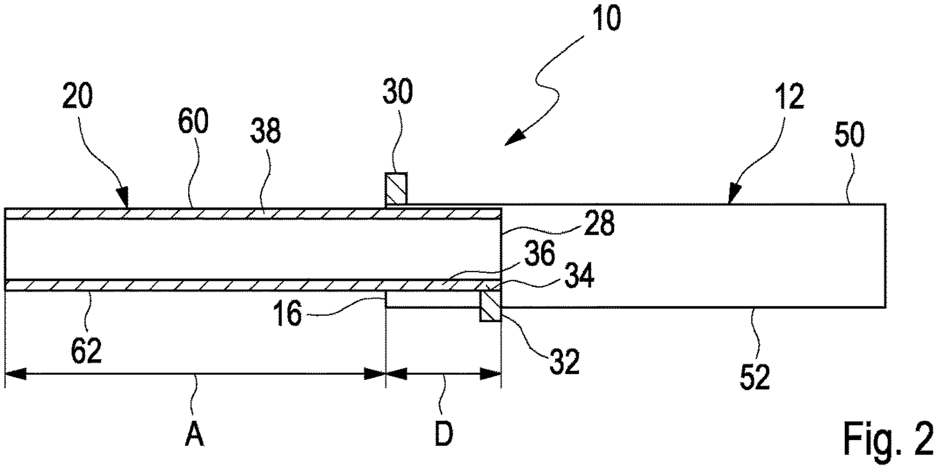
FIG. 2 shows a lateral, highly schematic sectional illustration of a first embodiment of a supporting construction according to the invention.

According to a first embodiment of the invention, as shown schematically in FIG. 2, the supporting leg box 12 has, in the region or area of its open front side 16, a first load introduction device 30. As can also be seen, for example, from the illustration in FIG. 6, the first load introduction device 30 can be designed in a manner known per se as a substantially U-shaped reinforcing bracket, which is open at the bottom and has a base 40 and free arms 42 projecting downward from the base 40. An underside of the base 40 forms a supporting surface 44, on which the upper flange 60 of the supporting leg 20 is supported as described in more detail below (cf. FIG. 6). When the supporting leg 20 absorbs load during operation, it is supported with its upper flange 60 on the supporting surface 44. Other embodiments of the first load introduction device 30 are possible. Thus, the U-shaped reinforcing bracket can not only be arranged (as illustrated and described) in front of the upper flange 50 and form the supporting surface 44 there, but it is also possible to place the reinforcing bracket on the upper flange, thus ensuring that the flow of force through the upper flange takes place onto the base 40 of the bracket. It is furthermore possible, as will be described below, to arrange the first load introduction device in the region of the side surface (webs) of the supporting leg box.

Figure 8:
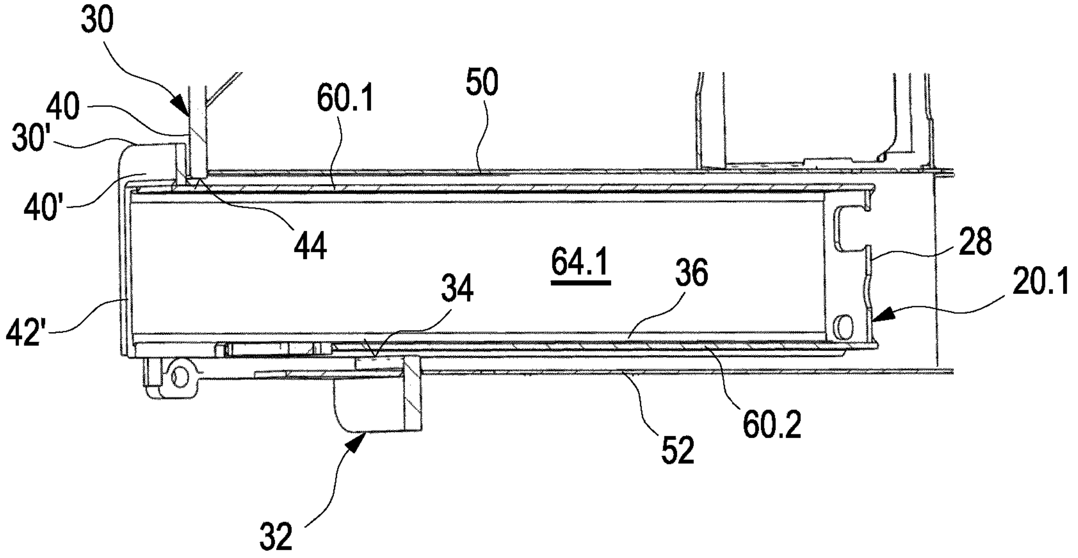
FIG. 8 shows the supporting construction of FIG. 7 in the retracted state.

Furthermore, according to the invention, the supporting leg box 12 has a single second load introduction device 32 in the interior. The second load introduction device 32 is arranged in the supporting leg box 12 at a given distance D from the front side 16 of the supporting leg box 12. The given distance D corresponds substantially to the described residual length with which the supporting leg 20 remains in the supporting leg box 12 in its fully extended position. Typically, this "residual length" is about 20 to 30% of the extension length. This ensures that, when the load is being absorbed during operation, the supporting leg 20 can (still) be supported by a rear end 28 on a supporting surface 34 of the second load introduction device 32. The second load introduction device 32 can be designed to pass through one or more through-aperture(s) provided for this purpose in the wall (web plates 54 and/or lower flange 52) of the supporting leg box (see, for example, FIGS. 6 and 9). The second load introduction device 32 can be designed in such a way that its supporting surface 34 projects relative to a surface of the lower flange, as can be seen especially from FIGS. 6, 8 and 9. This projection or "elevation" serves to prevent the supporting leg from possibly imposing a load on points of the lower flange that are not designed for load dissipation during displacement into the retracted position (the invention of course deliberately dispenses with the formation of further load dissipation points in the supporting leg box). Typically, the described elevation is about 20 to 50 mm, depending on the dimensioning (especially the length) of the supporting leg. A person skilled in the art will be easily able to select a suitable elevation within the scope of his or her expert knowledge.

According to the invention, there are thus exactly two support points 34, 44 in or on the supporting leg box 12 for load dissipation from the supporting leg 20, namely a support point or supporting surface 44 for upward load dissipation on the front side 16 and a support point or supporting surface 34 for downward load dissipation.

As already described, the position of the support point formed by the second load introduction device 32 is determined at a distance in the longitudinal direction 22 from the front side 16 of the supporting leg box. The second load introduction device 32 may, for example, have a supporting surface 34 extending transversely (perpendicularly or at an angle not equal to 90° or less than 90°) to the longitudinal direction 22. Alternatively, the second load introduction device 32 can have a plurality of supporting surfaces 34 arranged at the given distance from the front side on the periphery of the supporting leg box, on the lower flange 52 and/or the web plates 54 thereof.

In the context of the first embodiment of the invention according to FIG. 2, the second load introduction device 32, like the first load introduction device 30, can be designed as a substantially U-shaped bracket which is open at the top and comprises a base 46 and free arms 48 projecting upward from the base 46 (see, for example, FIG. 6). The upper side of the base 46 forms the supporting surface 34. As can be seen from FIG. 6, the base 46 of the bracket can reach through the lower flange 52 of the supporting leg box.

As can be seen from FIG. 2, the supporting construction 10 further comprises, according to the invention, a reinforcing element 36 which extends in the supporting leg 20 substantially over the length L of the supporting leg 20. The reinforcing element 36 is designed to rest on the supporting surface 34 of the single second load introduction device 32.

The reinforcing element 36 can be of various different designs. For example, the reinforcing element 36 can be formed by a reinforcing plate of the lower flange 62 that extends over substantially the entire length of the supporting leg 20.

Alternatively, the reinforcing element 36 can be formed by two reinforcing strips extending along the respective edges of the web plates 64 at which they abut the lower flange 62. In this case, this would be a multi-part reinforcing element 36, the parts of which each extend over substantially the entire length of the supporting leg 20.

As a further alternative, the reinforcing element 36 can be formed by suitable material reinforcements or material widenings of the web plates 64 in the region of the connection to the lower flange 62, as illustrated, for example, in FIG. 9. Conversely, the reinforcing element 36 can, of course, also be formed by suitable material reinforcements or material widenings of the lower flange 62 in the region of the connection to the web plates 64.

The configuration of the reinforcing element 36 as extending substantially over the entire length of the supporting leg 20 gives the invention a high degree of desired flexibility since any desired extension setting of the supporting leg 20 is now made possible with constantly ensured load dissipation downward via the single second load introduction device 32.

In the embodiment illustrated in FIG. 2, the supporting leg 20 furthermore likewise has, in the region of its upper flange 60, an upper flange reinforcement which extends substantially over the entire length of the supporting leg 20. As regards the configuration of the upper flange reinforcement, what has been stated above in connection with the reinforcing element 36 applies.

Figure 3:
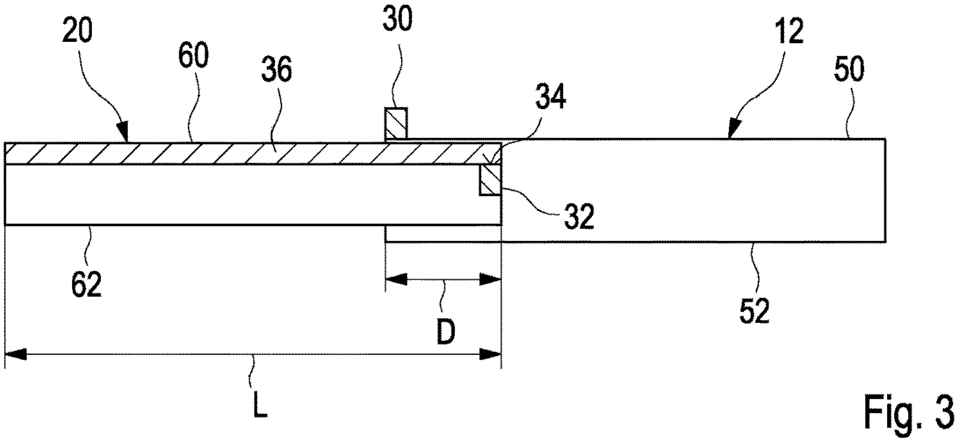
FIG. 3 shows a lateral, highly schematic sectional illustration of a second embodiment of a supporting construction according to the invention.

According to a second embodiment of the invention, as illustrated schematically in FIG. 3, the second load introduction device 32 is not formed primarily in the lower flange 52 of the supporting leg box 12, but rather in the lateral web plates 54 thereof. For example, a reinforcing peg with a supporting surface 34 can be provided on or in each of the two opposite web plates 54 (in each case at the given distance D from the front side of the supporting leg box 12). The reinforcing pegs can, but do not have to, each be arranged at the same height (in principle, the two pegs can be arranged at different heights, in which case the longitudinally extending reinforcements on the left and right of the supporting leg must correspondingly also be arranged at different heights).

In this case, the second load introduction device 32 is of multi-part design. The reinforcing pegs of the second load introduction device 32 can each be inserted and welded into through-apertures provided for this purpose in the web plate. On the outside, the second load introduction device 32 can be configured so as to end substantially in one plane with the web plate 54, while it protrudes sufficiently far inward in the supporting leg box to form a suitable supporting surface 34.

In principle, there is also the possibility of configurations in which, on account of construction-related boundary conditions, the front side 16 of the supporting leg box does not run perpendicularly to the longitudinal axis of the supporting leg (that is to say the longitudinal direction 22). This can lead to the first (upper) load introduction device running "obliquely" to the supporting leg (i.e. at an angle not equal to 90° to the longitudinal direction 22, in particular at an angle of less than 90°, for example between 0° and 60°). As a result, once again depending on the given construction-related boundary conditions, there can be combinations for the second load introduction device that differ but fall within the present invention: i) the supporting surface formed by the second load introduction device (either from one element, as in the first embodiment, or from two elements, as in the second embodiment) runs substantially perpendicularly to the longitudinal axis of the supporting leg; then the clearances of the supporting surface to the left and right at the side surfaces (webs) of the supporting leg are different. In this case, the "given distance D" can be seen as an average, e.g. calculated along the central axis of the supporting arrangement. ii) The supporting surface formed by the second load introduction device (either from one element, as in the first embodiment, or from two elements, as in the second embodiment) likewise runs obliquely to the longitudinal axis of the supporting leg, either at the same angle as the first load introduction device or at another angle; then the clearances on the left and right can be either the same (same angle) or once again different (different angle). In this case, too, it is appropriate to regard the "given distance D" as an average, e.g. calculated along the central axis of the supporting arrangement. The essential aspect of the invention consists in that precisely one load introduction device is provided in the interior of the supporting leg box, and it does not necessarily have to have the same orientation (with respect to the longitudinal direction) as the first load introduction device in its transverse extension (with respect to the longitudinal axis of the leg) (i.e. it runs obliquely with respect to said first load introduction device).

As can be seen from the illustration in FIG. 3, in this embodiment the reinforcing element 36, which extends substantially over the length of the supporting leg, is not formed in the region of the lower flange 62 but is formed on the web plates 64 of the supporting leg 20 at a height adapted to the position of the described reinforcing pegs of the second load introduction device 32. In this case—as illustrated—the reinforcing element 36 can be extended upward in its height into the region of the upper flange 60 and thus can additionally fulfill the function of the above-described upper flange reinforcement.

Figure 13:
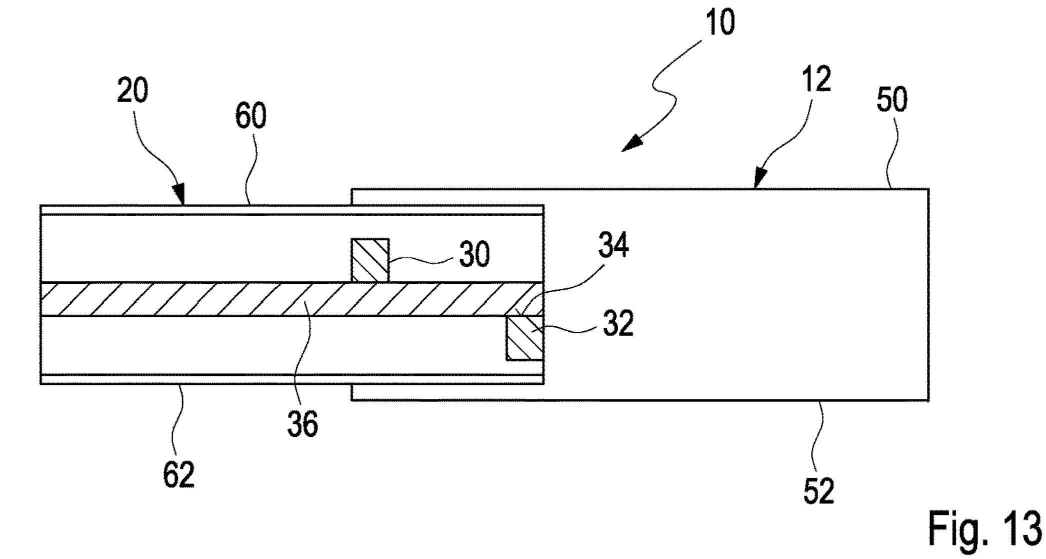
FIG. 13 shows a further modification of the embodiment of FIG. 3.

A further variant is shown in FIG. 13. In the supporting construction 10 of this variant, the first load introduction device 30—as already indicated above—is not arranged in the region of the upper flange 50 of the supporting leg box but on the webs/web plates 54. This likewise allows the reinforcing element 36 to be used both for upward load dissipation and for downward load dissipation. FIGS. 14*a*, 14*b*, and 14*d* illustrate alternative configurations of the supporting leg hollow profile with reinforcing elements 36 inserted or mounted (in apertures provided for this purpose or in a space between the two superimposed U-profiles). Thus, the hollow body can be of two-part construction, for example. FIGS. 14*a* and 14*b* show a variant with two substantially U-shaped bent profiles, which are assembled and welded by means of their arms (for the formation of the webs or web plates) with their openings facing one another. In the variants of FIGS. 14*c* and 14*d*, a plate is welded as an upper flange onto an upright U-profile.

The invention extends not only to one-piece supporting legs 20, as described in conjunction with the schematic illustrations in FIGS. 2 and 3, but also to multi-part extendable supporting legs, in particular telescopic legs. Such configurations are illustrated analogously to FIGS. 2 and 3 in FIGS. 4 and 5, respectively.

Figure 4:
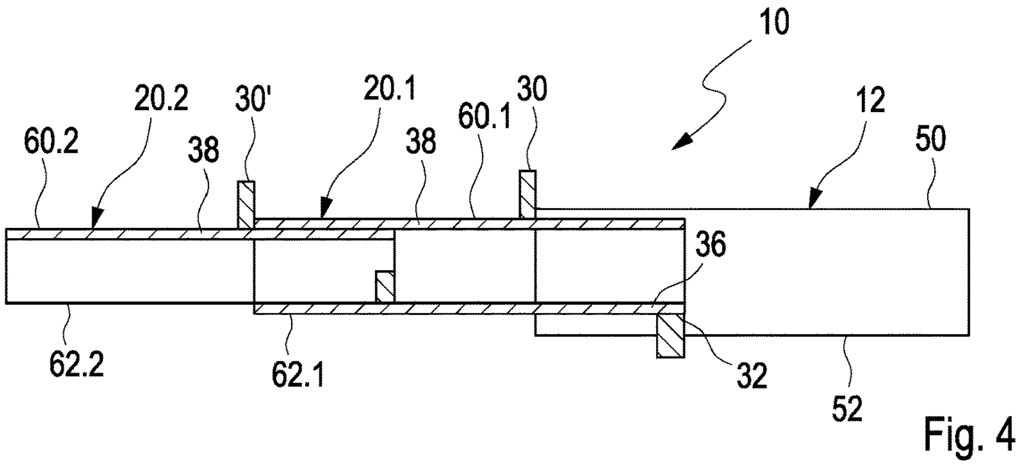
FIG. 4 shows, with reference to the illustration in FIG. 2, a variant of the first embodiment having a supporting leg designed as a telescopic leg.
Figure 5:
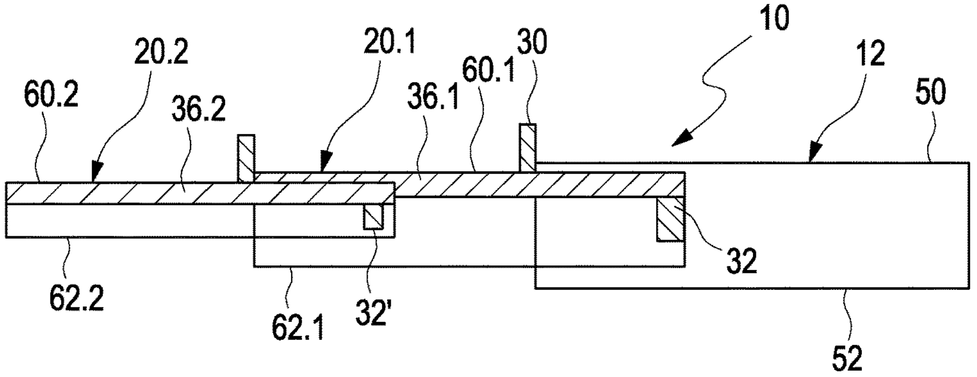
FIG. 5 shows, analogously to the illustration in FIG. 3, a variant of the second embodiment having a supporting leg designed as a telescopic leg.

The illustrations in FIGS. 4 and 5 show configurations with 2-part telescopic legs consisting of an extendable leg guided in a telescopic box, the telescopic box in turn being slidably mounted in the supporting leg box. In simpler terms, the hollow body 24 of the previous supporting leg, as described above, now serves as a telescopic box 20.1 for receiving an extendable leg 20.2 with a smaller cross section, which is mounted therein so as to be slidable in the longitudinal direction. This means that it is necessary to provide not only load dissipation means in the supporting leg box 12 for the telescopic box 20.1 (the original single supporting leg) but also load dissipation means in the telescopic box 20.1 for the additional extendable leg 20.2.

The two principles, described in conjunction with FIGS. 2 and 3, of a second load introduction device 32 in the region of the lower flange 52 or on the web plates 54 can equally be adopted for the configuration of the load dissipation means between the extendable leg 20.1 and the telescopic box 20.2, as illustrated in FIGS. 4 and 5, but they can also be combined with one another or with load dissipation means known from the prior art.

Thus, the exemplary embodiment of FIG. 9 shows a variant which makes use of the first embodiment according to FIG. 2 between the supporting leg box 12 and the telescopic box 20.1, while a configuration known from the prior art (cf. e.g. DE 10 2014 014 038 A1) is used for the load dissipation means between the extendable leg 20.2 and the telescopic box 20.1. Thus, more specifically, the material thickenings forming the reinforcing element 36 extending over the length L of the supporting leg in the transition region between the web plates 64.1 and the lower flange 62.1 of the telescopic box 20.1 simultaneously serve toward the inside as supporting surfaces for downwardly extended webs 66 of the web plates 64.2 of the extendable leg 20.2.

It should be noted that the eccentric arrangement of the telescopic leg in the supporting leg box in FIG. 9 is only illustrative and due to specific design criteria, and that, of course, other arrangements and, in particular, symmetrical arrangements are also possible.

Figure 10:
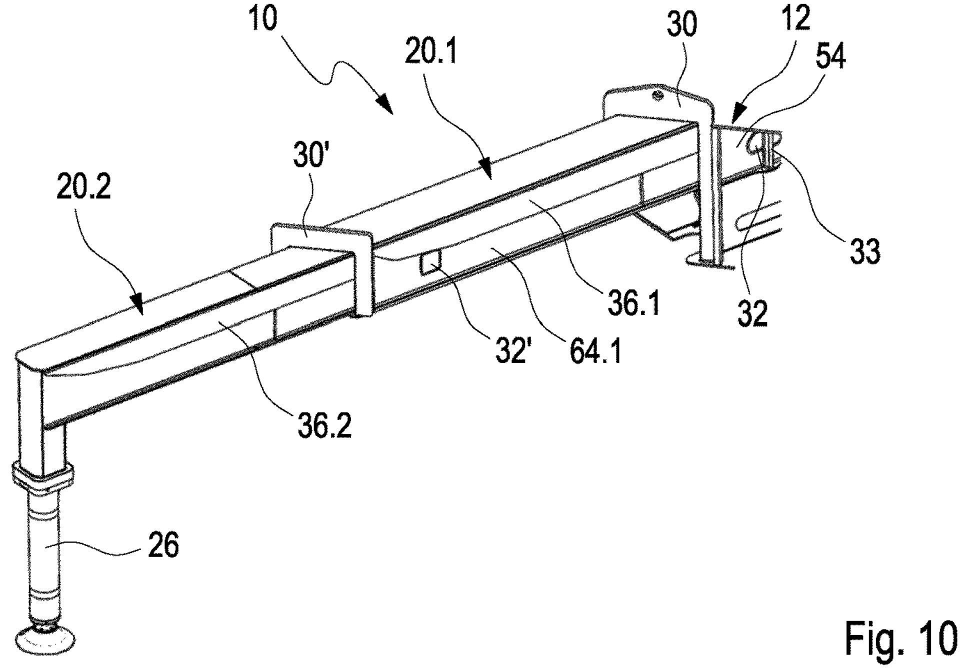
FIG. 10 shows the supporting construction of FIG. 5 in a perspective illustration in the extended state.

FIG. 10 shows a telescopic leg variant of the embodiment in FIG. 3 with a supporting leg box 12, a telescopic box 20.1 mounted therein so as to be slidable in the longitudinal direction, and an extendable leg 20.2 mounted in turn in the telescopic box 20.1 so as to be slidable in the longitudinal direction.

As already described in conjunction with FIG. 3, the supporting leg box 12 has a second load introduction device 32 in the web plates 54. As indicated in FIG. 10, a strap 33 extending over the height of the web plate 54 can also be provided on the outside of the web plate 54, which strap is supported in each case on projections of the upper flange and of the lower flange and serves to improve the dissipation of force.

The telescopic box 20.1 has a reinforcing element 36.1 which extends substantially over its length and is formed by "rails" (referred to as web plate doubling means) which are applied to both sides of the web plates 64.1 and designed to rest on the supporting surfaces 34 of the second load introduction device 32. In terms of height, the rails forming the reinforcing element 36.1 extend upward as far as projections 61.1 of the upper flange 60.1, to which they are welded (cf. also the illustration in FIG. 12). The rails thus have the dual function, described in conjunction with FIG. 3, of intensifying the force dissipation both with respect to the first load introduction device 30 and the second load introduction device 32.

Figure 11:
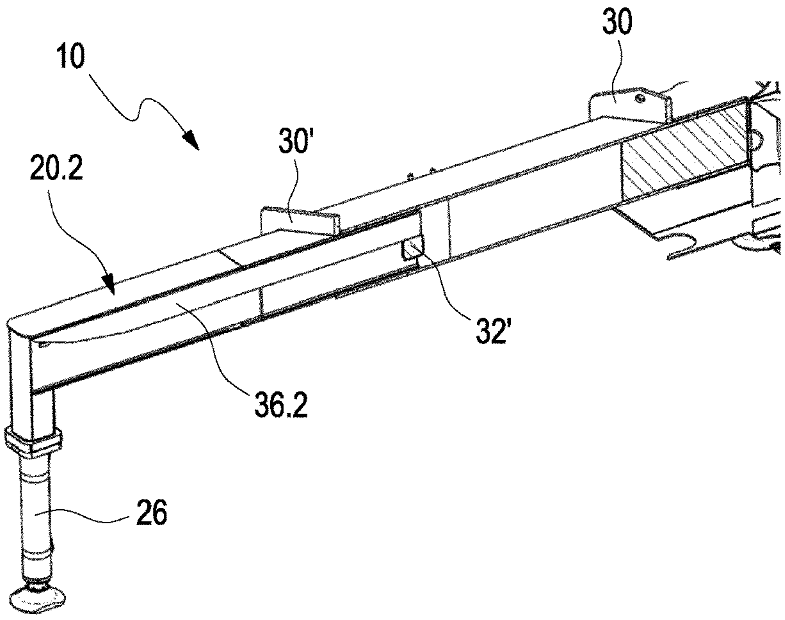
FIG. 11 shows the supporting construction of FIG. 10 in a laterally cutaway perspective illustration in the extended state.

Analogously, pegs that form a second load introduction device 32' with supporting surfaces 34' are recessed into the web plates 64.1 of the telescopic box 20.1, being situated opposite and at the same height (cf. also FIGS. 11 and 12), and the extendable leg 20.2 has a reinforcing element 36.2 which extends substantially over its length and is formed by rails applied to both sides of the web plates 64.2, which are designed to rest on the supporting surfaces 34' of the second load introduction device 32'. In terms of height, the rails forming the reinforcing element 36.2 extend upward as far as projections 61.2 of the upper flange 60.2, to which they are welded (cf. also the illustration in FIG. 12).

According to the invention, a single load introduction point is provided in the supporting leg box, with the result that only one load introduction has to be calculated, thereby greatly reducing the calculation effort for the supporting leg box. The individual load introduction point in the supporting leg box entails a force flow direction independent of the leg position (irrespective of the leg setting, the same front and rear load introduction points are always used, in contrast, for example, to DE 10 2014 014 038 A1), and therefore there are only very few parts or regions through which force flows. The fact that reinforcement is necessary at only one point has a favorable effect on the cost and weight of the construction.

The invention claimed is:

1. A supporting construction (10) for a work machine comprising a mast, a supporting leg box (12) which is open to a front side (16), and a supporting leg (20) slidingly movable in the supporting leg box (12) in a longitudinal direction (22) between a fully retracted position and a position in which it is fully extended from the supporting leg box (12) by a maximum extension length (A), wherein the supporting leg box (12) comprises a first load introduction device (30) in an area of its open front side (16), and a single second load introduction device (32) having at least one supporting surface (34) arranged within the supporting leg box at a given distance (D) from the front side (16), the single second load introduction device (32) passing through one or more through-aperture(s) in a wall of the supporting leg box (12) and projecting with respect to an inner surface of the supporting leg box (12), and wherein the supporting leg (20) comprises a reinforcing element (36) extending along a length (L) of the supporting leg (20) and which rests on the at least one supporting surface (34) of the single second load introduction device (32).

2. The supporting construction (10) of claim 1, wherein the first load introduction device (30) in the area of the open front side (16) is a reinforcement of an upper flange (50) or a reinforcement of at least one web plate (54) of the supporting leg box (12).

3. The supporting construction (10) of claim 1, wherein the single second load introduction device (32) is a reinforcement of a lower flange (52) or a reinforcement of at least one web plate (54) of the supporting leg box (12).

4. The supporting construction (10) of claim 1, wherein the given distance (D) corresponds substantially to the length (L) of the supporting leg (20) minus the maximum extension length (A).

5. The supporting construction (10) of claim 1, wherein the reinforcing element (36) acts on the first load introduction device (30).

6. The supporting construction (10) of claim 1, wherein the single second load introduction device (32) is of multipart design.

7. The supporting construction (10) of claim 1, wherein the single second load introduction device (32) comprises a supporting surface (34) which extends transversely to the longitudinal direction (22).

8. The supporting construction (10) of claim 1, wherein the single second load introduction device (32) comprises a plurality of supporting surfaces (34) distributed over a periphery of the supporting leg box (12), at the given distance (D) from the front side (16).

9. The supporting construction (10) of claim 7, wherein the supporting surface (34) is formed on a lower flange (52) or on web plates (54).

10. The supporting construction (10) of claim 1, wherein the supporting surface (34) extends at an angle of 90° to the longitudinal direction (22), or in which the supporting surface (34) extends at an angle not equal to 90° to the longitudinal direction (22).

11. The supporting construction (10) of claim 1, wherein a transverse extension of the single second load introduction device (32) extends parallel to a front side of the first load introduction device (30) or in which a transverse extension of the single second load introduction device (32) does not have the same orientation as the front side of the first load introduction device (30).

12. The supporting construction (10) of claim 1, wherein the given distance (D) in the longitudinal direction (22) is determined along a central axis of the supporting leg box (12) from a front side of the first load introduction device (30) to an intersection of the central axis with a transverse extension of the single second load introduction device (32).

13. The supporting construction (10) of claim 1, wherein the single second load introduction device (32) is a substantially U-shaped bracket which is open at the top.

14. The supporting construction (10) of claim 1, wherein the single second load introduction device (32) is a reinforcement of a lower flange (52) or a reinforcement of web plates (54) of the supporting leg box.

15. A supporting construction (10) for a work machine comprising a mast, a supporting leg box (12) which is open to a front side (16), and a supporting leg (20) slidingly movable in the supporting leg box (12) in a longitudinal direction (22) between a fully retracted position and a position in which it is fully extended from the supporting leg box (12) by a maximum extension length (A), wherein the supporting leg box (12) comprises a first load introduction device (30) in an area of its open front side (16), and a single second load introduction device (32) in the form of a substantially U-shaped bracket which is open in a direction facing the supporting leg (20), said single second load introduction device (32) having at least one supporting surface (34) arranged within the supporting leg box at a given distance (D) from the front side (16), and wherein the supporting leg (20) comprises a reinforcing element (36) extending along a length (L) of the supporting leg (20) and which rests on the at least one supporting surface (34) of the single second load introduction device (32).

16. A supporting construction (10) for a work machine comprising a mast, a supporting leg box (12) which is open to a front side (16), and a supporting leg (20) slidingly movable in the supporting leg box (12) in a longitudinal direction (22) between a fully retracted position and a position in which it is fully extended from the supporting leg box (12) by a maximum extension length (A), wherein the supporting leg box (12) comprises a first load introduction device (30) in an area of its open front side (16), and a second load introduction device (32) having a supporting surface (34) arranged within the supporting leg box at a given distance (D) from the front side (16), said second load introduction device (32) projecting inwardly from opposite side webs (54) of the supporting leg box (12), and wherein the supporting leg (20) comprises a reinforcing element (36) projecting outwardly from first and second side web plates (64) of the supporting leg (20), said reinforcing element (36) extending along a length (L) of the supporting leg (20) and which rests on the supporting surface (34) of the second load introduction device (32).

17. The supporting construction (10) claim 16, wherein the second load introduction device (32) extends through an opening in the first and second side web plates (54).

18. The supporting construction (10) of claim 17, wherein the second load introduction device (32) is configured to end in a plane with an outside surface of the side webs (54) of the supporting leg box (12).

* * * * *